Figure 1:
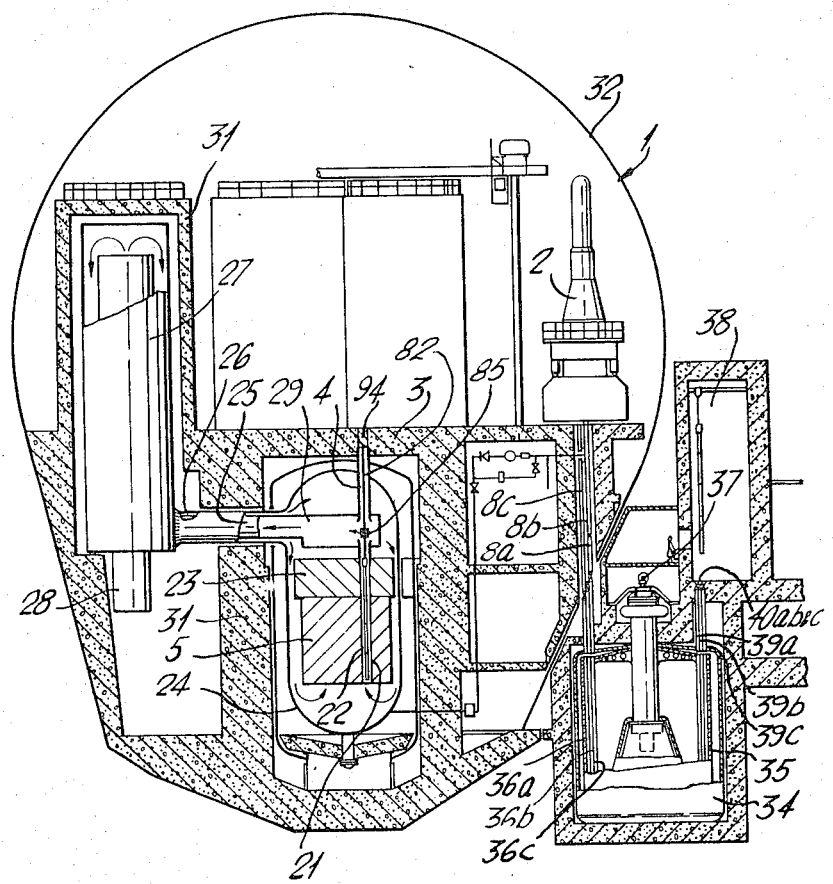

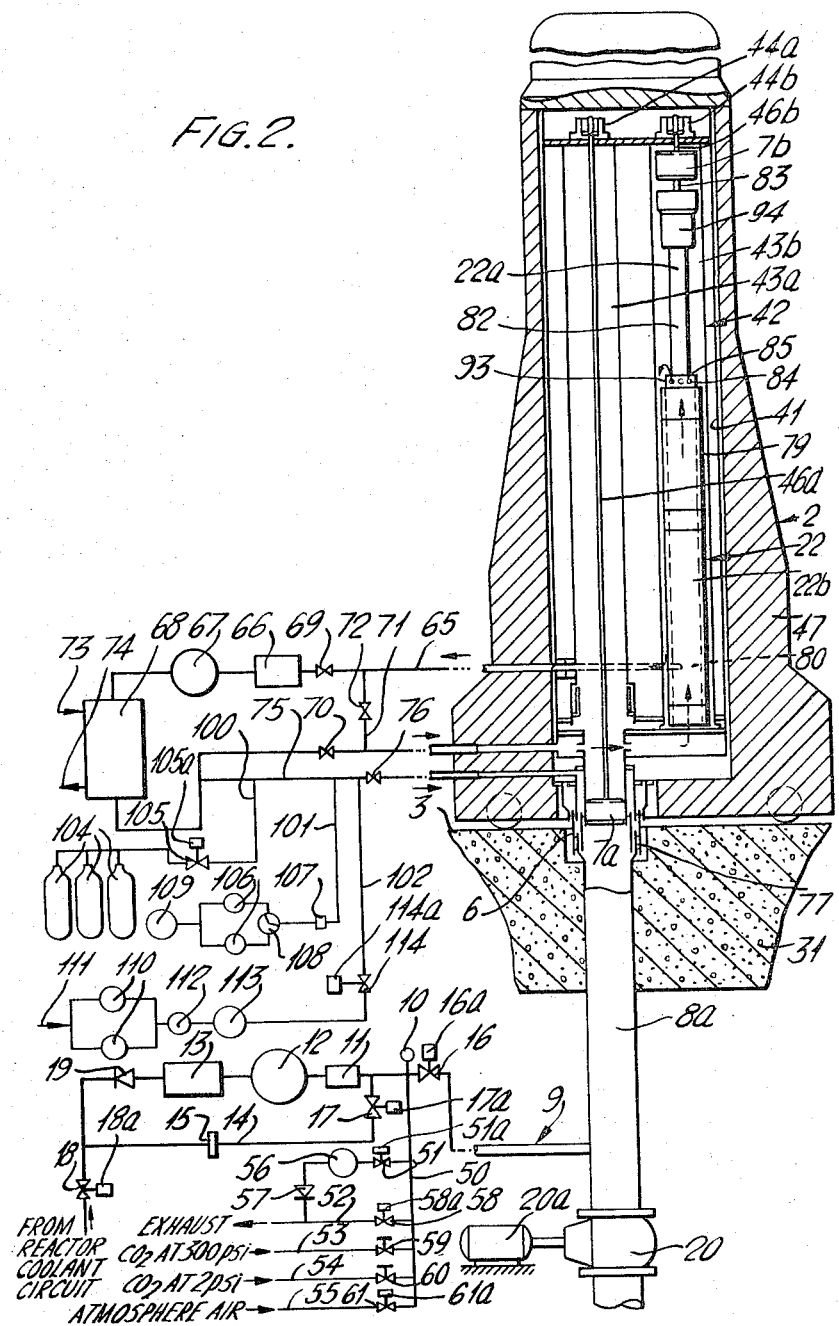

United States Patent Office 3,300,389
Patented Jan. 24, 1967

3,300,389
REFUELLING MACHINES FOR GAS COOLED NUCLEAR REACTORS
Gordon Packman, Culcheth, Warrington, and James Leslie Kearney, Allerton, Liverpool, England, assignors to United Kingdom Atomic Energy Authority
Filed Mar. 30, 1964, Ser. No. 355,856
Claims priority, application Great Britain, Apr. 11, 1963, 14,541/63
5 Claims. (Cl. 176—32)

This invention relates to refuelling machines for gas-cooled nuclear reactors and is concerned with facilities for the internal pressurisation of that kind of refuelling machine which is movable across the charge face of the reactor to connect with core access tubes extending away from adjacent the reactor core to terminate at the charge face, the refuelling machine having a valved nose-piece connectable, in a pressure-tight manner, to any of the access tubes. Such a refuelling machine is hereinafter referred to as "of the kind described."

One form of pressurising facility has been proposed wherein the refuelling machine is pressurised internally by gas drawn from a gas-holder carried by the machine, but this arrangement is unsatisfactory as it adds to the already considerable bulk and weight of the machine.

Another form of pressurising facility has been proposed wherein a stationary gas-holder is sited adjacent the reactor charge face and is connected to the interior of the machine through flexible hose. The disadvantage of this arrangement is that, in the event of failure of a hose, (for example, by the refuelling machine accidently running over it) gas (which may be contaminated by radioactive matter), can then escape into the charge face region of the reactor.

According to the present invention, a pressurising facility for a refuelling machine of the kind described comprises a stationary member of tubular form adjacent the reactor charge face and connectable directly with the nosepiece of the refuelling machine, means connecting the interior of the member with a source of pressurised gas of the same kind as the reactor coolant gas, and means for controlling the pressure of gas within the member.

An embodiment of the invention will now be described by way of example with reference to the accompanying drawings wherein:

FIGURE 1 is a side view partly in medial section of a nuclear reactor installation, and FIGURE 2 is a part-diagrammatic side view in section of a detail and is drawn to a larger scale than that of FIGURE 1.

Referring firstly to the FIGURE 1 of the drawings, a gas-cooled nuclear reactor 1 has a refuelling machine 2 movable across the charge face 3 of the reactor to connect with any of a plurality of core access tubes one of which is shown in FIGURE 1 and designated 4, extending away from adjacent the reactor core 5 to terminate at the charge face 3. The machine 2 has a telescopic nose-piece 6 (see FIGURE 2) which is shown closed by a plug 7a and the nose-piece 6 is connected directly with an upright, stationary member 8a of tubular form. The member 8a is one of a row of three similar members 8a, 8b, 8c. The upper ends of the members 8a, 8b, 8c terminate at the charge face 3 and the interior of the member 8a only is connected to the reactor coolant circuit by way of a gas pressurising and depressurising unit 9 (FIGURE 2).

Referring now to FIGURE 2, the unit 9 is shown diagrammatically and comprises a pressure gauge 10, a filter 11, a compressor 12, an oiltrap 13, a compressor by-pass line 14 with a flow restrictor 15, stop valves 16, 17, 18 controlled by pneumatic actuator 16a, 17a, 18a respectively, and a non-return valve 19. There is also a purge line 50 with a branch 52 to a constant (low) pressure exhaust, a branch 53 connected to a source of $CO_2$ gas at 300 p.s.i.g., a branch 54 connected to a source of $CO_2$ gas at 2 p.s.i.g., a branch 55 forming an atmospheric air inlet and a vacuum pump 56 with isolation valve 51 connected by way of a non-return valve 57 to the exhaust branch 52. The branches 52, 53, 54 and 55 have isolation valves 58, 59, 60 and 61 respectively. Valves 51, 58 and 61 are controlled by pneumatic actuators 51a, 58a and 61a respectively. The valves 59 and 60 are controlled manually. The member 8a has an isolation valve 20 controlled by an electric motor 20a. The members 8b and 8c have valves and motors (not shown) similar to valve 20 and motor 20a.

The reactor 1 is of the type described in detail in British patent specifications Nos. 882,714 and 866,541 and the reactor core 5 is formed by side-stacked columns of graphite blocks defining a lattice of two hundred and fifty three fuel channels 21 (only one being shown) each locating a fuel stringer 22. The core 5, together with a neutron shield 23, is enclosed within a pressure vessel 24. The vessel 24 is connected by way of coaxial ducts, one pair of which is shown in FIGURE 1 of which the inner and outer are designated 25 and 26, respectively, to four external heat exchangers, one of which is shown in FIGURE 1 and designated 27. $CO_2$ gas coolant is circulated (at 285 p.s.i.) through the reactor core 5 and heat exchangers by coolant blowers, one of which is shown in FIGURE 1 and designated 28, disposed in pressure-tight casings attached to the base of each heat exchanger. The blowers cause coolant to flow from the heat exchangers along the outer ducts of the coaxial ducting and into the pressure vessel 24 to pass downwardly between the core 5 and the pressure vessel 24 before returning in counter-direction over the fuel stringers 22 in the channels 21. From the upper ends of the channels 21 the coolant enters a header vessel 29 and from thence returns to the heat exchangers through the inner ducts of the coaxial ducting which connect the header vessel 29 to the heat exchangers. The access tube 4 is one of two hundred and fifty-three tubes penetrating the header vessel 29 and pressure vessel 24 and the upper end of each of the tubes 4 is closed by a removable biological seal plug 94 connected to the respective fuel stringer 22. The pressure vessel 24 and heat exchangers are enclosed in a concrete shielding 31, part of which defines the charge face 3. The reactor 1 is enclosed in a steel containment 32.

The members 8a, 8b, 8c extend downwardly from the charge face 3 to penetrate the reactor containment 32 and terminate at a fuel storage cell 34. The cell 34 houses a fuel storage magazine 35 with three concentric rings of storage tubes 36a, 36b, 36c. Rotation of the magazine 35 by a motor 37 aligns one of each of the tubes 36a, 36b, 36c with the lower ends of the members 8a, 8b, 8c respectively. Outwardly and above the storage cell 34 is a fuel handling cell 38. Fuel transfer tubes 39a, 39b, 39c with isolation valves 49a, 40b, 40c respectively, connect the interior of the cell 38 with the cell 34. $CO_2$ gas at 1 p.s.i.g. is circulated through the cell 34 to remove heat from irradiated fuel when housed in the magazine 35.

The refuelling machine 2 (which is of the type disclosed in British patent specification No. 897,454) has (see FIGURE 2) a pressure vessel 41 containing a fuel storage magazine 42 having three vertically oriented storage tubes 43a, 43b, 43c (only 43a and 43b being shown in FIGURE 2). The magazine 42 is rotatable within the pressure vessel 41 so that each of the three tubes 43a, 43b 43c can be aligned in turn with the nose-piece 6. The vessel 41 also contains three hoisting units 44a, 44b, 44c (only 44a and 44b being shown in FIGURE 2) with seal plugs 7a, 7b, 7c suspended from chains 46a, 46b, 46c (plug 7c and chain 46c are not shown in FIGURE 2). The hoisting units are arranged to be rotatable with the magazine 42, with the unit 44a disposed above the storage tube 43a, the unit 44b above the tube 43b and the unit 44c above the tube 43c. The vessel 41 is enclosed within cast iron shielding 47.

The refuelling machine 2 has a fuel stringer coolant circuit 65 comprising a filter 66, a blower 67, a heat exchanger 68, flow control valves 69, 70 and a by-pass line 71 with a control valve 72. Heat can be removed from $CO_2$ circulated in the circuit 65 by passing cold air through the heat exchanger 68. The cold air enters the heat exchanger 68 through an inlet 73 and leaves through an outlet 74. A branch line 75 with an isolation valve 76 connects the circuit 65 with the interior of the nose-piece 6 of the refuelling machine and provides, when the nose-piece 6 is connected to a reactor access tube 4, cooling of a flexible nose-piece seal 77. (This cooling is necessary only when the refuelling machine 2 is connected to a reactor access tube 4 and not when connected, as shown in FIGURE 2, to the member 8a.)

The refuelling machine 2 also carries gas and air purging facilities 100, 101, 102, connected to the branch line 75. The gas pressurising facility 100 comprises a bank of $CO_2$ storage bottles 104 connected to the branch line 75 by way of a flow regulating valve 105 controlled by a pneumatic actuator 105a. The air evacuation facility 101 comprises a pair of parallel-connected evacuation pumps 106 drawing from the branch line 75 by way of a filter 107 and change-over valve 108 and discharging to a small capacity storage tank 109. (In operation only one of the pumps 106 is used, the other being employed as a standby.) The air pressurising facility 102 comprises a pair (one main and the other stand-by) of parallel-connected air compressors 110 having a common inlet 111 and discharging, by way of auxiliary and main reservoirs 112, 113, respectively, and an isolation valve 114, to the branch line 75. The isolation valve 114 is controlled by a pneumatic actuator 114a. The compressors 110 supply the air for the pneumatic controllers 105a, 114a.

The refuelling machine 2 is shown housing a fuel stringer 22 in the storage tube 43b. The fuel stringer 22 is of the type disclosed in British patent specification No. 889,536 and comprises a tubular housing 79 defining a space 80 locating one or more clusters of nuclear fuel rods. The housing 79 is connected to a biological shield plug 94 by an extension 82 which is releasably connected in turn to the seal plug 7b by a coupling 83. Heat is removed from the fuel rods of a fuel stringer (both in the reactor and the refuelling machine) by coolant flow up through the interior of the housing 79 to discharge from out-flow ports 84 in a flow-restrictor valve assembly 85.

Each fuel stringer 22 is in two connectable parts, namely a plug part 22a and a fuel part 22b. The plug part 22a comprises the shield plug 94, the extension 82 and the restrictor assembly 85. The fuel part 22b comprises the housing 79 and the fuel rods contained therein. The parts 22a, 22b are releasably coupled by a demountable coupling at 93.

In operation, with reference to FIGURE 2, first assume the fuel stringer 22 shown within the refuelling machine 2 to have been recently removed in an irradiated condition from the reactor core 5, and the machine to be full of coolant at reactor pressure. With the nose-piece 6 in the withdrawn position and sealed by the plug 7a, valves 69 and 70 of the circuit 65 open and valve 72 closed, coolant is circulated at reactor pressure (by the blower 67) through the machine 2 and the fuel stringer 22 as shown by the arrows, heat taken from the fuel stringer being given up to air passed through the heat exchanger 68. Meanwhile the refuelling machine 2 is manoeuvred over the member 8a and the nose-piece 6 then moved down to connect with the member 8a (as shown), the valve 20 being closed.

Air is next extracted from the upper interior of the member 8a by opening the valves 16 and 51 and starting up the vacuum pump 56. After extraction of the air the valve 51 is closed and the pump 56 stopped. The valves 17 and 18 are then opened to allow coolant gas at reactor pressure to flow slowly through the restrictor 15 to the interior of the member 8a. When the pressure in the member 8a rises to reactor pressure (285 p.s.i.) the valves 17, 18 are closed, the valve 51 opened and the pump 56 restarted to evacuate the member 8a. The valve 51 is then closed and the pump 56 stopped. The valves 17, 18 are next opened and reactor coolant again allowed to flow to the interior of the member 8a. This double pressurising and evacuation provides a purge and ensures that no air remains in the member 8a. When full reactor pressure is reached again in the member 8a, the pressure differential across the plug 7a becomes zero and the plug is withdrawn from the nose-piece 6 by the hoist 44a up into the interior of the refuelling machine 2 where it is stored in the storage tube 43a. The valve 17 is then closed and the compressor 12 started so as to depressurise the machine 2 by drawing coolant from the interiors of the machine 2 and member 8a and to return this coolant to the reactor coolant circuit. Meanwhile the blower 67 continues to circulate coolant remaining in the machine 2 over the irradiated fuel stringer 22. When pressure within both the machine 2 and member 8a falls to 1 p.s.i.g. the compressor 12 is stopped and the valve 20 in the member 8a opened. The magazine 42 within the machine 2 is then rotated to bring the storage tube 43b containing the irradiated fuel stringer 22 into line with the member 8a and similarly the magazine 35 within the storage cell 34 is rotated to bring an empty tube 36a into line with the member 8a. The hoist 44b above the fuel stringer 22 is next used to lower the fuel stringer 22 down into the member 8a until the associated plug 7b closes off the nose-piece 6. The downward movement of the fuel stringer 22 is then arrested and remote-operated means used to disconnect the plug part 22a from the fuel part 22b and then to lower (using a chain conveyor arrangement—not shown—disposed within the member 8a) the fuel part 22b down into the magazine 35 in the cell 34. The valve 20 is then closed. Next, gas trapped in the portion of the member 8a below the seal plug 7b and above the valve 20 is removed by alternate evacuation (using the pump 56) and air purging (using the line 55). This alternate evacuation and purging is performed twice.

The nose-piece 6 is then withdrawn from the upper end of the member 8a to allow manual access to be gained to the coupling 83 of the plug part 22a of the fuel stringer 22. The coupling 83 is operated to break the connection and the nose-piece 6 again extended to re-connect with the member 8a. Air admitted to the upper end of the member 8a by raising the nose-piece 6 is now removed by double evacuation alternating with $CO_2$ gas purging, using the pump 56 and the line 54.

Next, the seal plug 7b is withdrawn by the hoist unit 44b up into the magazine tube 43b, and the magazine 42 rotated to bring the magazine tube 43a back in line with the member 8a. The hoist 44a is now used to lower the seal plug 7a down into the nose-piece 6 to close off said nose-piece.

Gas is removed from the upper end of the member 8a by double evacuation and air purging by use of the pump 56 and line 55 and the nose-piece 6 then raised to allow the seal plug 7a to be reconnected (by the coupling 83) to the plug part 22a in the member 8a. The nose-piece 6 is then lowered and air removed from the upper end of the member 8a by double alternate evacuation and gas purging, using the pump 56 and line 54.

The hoist 44a is now used to lift the plug part 22a up into the magazine tube 43a and the magazine 42 rotated to bring the magazine tube 43b into line with the member 8a. The seal plug 7b is then lowered (by the hoist 44b) to seal off the nose-piece 6.

Gas is next removed from the upper end of the member 8a by double evacuation alternating with air purging, using the pump 56 and line 55, the nose-piece 6 withdrawn from the member 8a and the refuelling machine 2 moved across the charge face 3 until the nose-piece 6 is disposed over the upper end of the member 8b. The nose-piece 6 is then moved down to connect with the member 8b, and air removed from the upper end of the member 8b (its isolation valve being closed) by double evacuation alternating with gas purging, using the pump 56 and line 54.

The seal plug 7b is now removed from the nose-piece 6 and stored in the magazine tube 43b and the magazine 42 rotated to bring the magazine tube 43a into line with the member 8b. Using the hoist 44a, the seal plug 7a and connected plug stringer 22a is then lowered down into the member 8b until the seal plug 7a seals off the nose-piece 6. Gas in the upper end of the member 8b is now removed by double evacuation alternating with air purging, using the pump 56 and the line 55. The nose-piece 6 is now raised and the coupling 83 between the seal plug 7a and the plug part 22a operated to break the connection.

The refuelling machine 2 is next moved over the reactor charge face 3 until the nose-piece 6 is aligned with the member 8c in which, using conventional chain-conveyor equipment (not shown), a "new" (i.e., non-irradiated) fuel stringer 22 has been disposed in the upper end thereof. The new fuel stringer 22 is coupled manually, employing a coupling 83, to the seal plug 7a and the nose-piece 6 is lowered down to engage with the upper end of the member 8c. Air is now removed from the upper end of the member 8c, through the nose-piece 6 and branch line 75, by double evacuation (using a pump 106), alternating with gas purging (using the facility 100). The hoist 44a is next used to withdraw the new stringer 22 up into the magazine tube 43a within the refuelling machine 2.

The magazine 42 is next rotated to bring the magazine tube 43b into line with the nose-piece 6 and the hoist 44b used to lower the seal plug 7b down to seal-off the nose-piece 6. Gas is then removed from the upper end of the member 8c by double evacuation (using a pump 106) alternating with air purging (using the facility 102) to atmosphere pressure. The nose-piece 6 is then raised.

The refuelling machine is now moved over the reactor charge face 3 to align the nose-piece 6 with the member 8a and the nose-piece 6 moved down to connect with the upper end of the member 8a by double evacuation alternating with gas purging, using the pump 56 and line 54. Using the hoist 44b the seal plug 7b is then withdrawn from the nose-piece 6 and stored within the magazine tube 43b.

The valves 17, 18 are now opened and gas at 285 p.s.i. is allowed to flow slowly through the restrictor 15 and fill the interior of the refuelling machine 2. When the interior of the refuelling machine 2 is at the same pressure as the reactor coolant circuit (285 p.s.i.) the valves 17, 18 are closed and the seal plug 7b lowered down to seal off the nose-piece 6. Gas is now removed from the upper end of the member 8a by double evacuation alternating with air purging, using the pump 56 and line 55.

The nose-piece 6 is now raised and the refuelling machine 2 moved across the reactor charge face 3 to align the nose-piece 6 with the upper end of an access tube 4 of the reactor and through which an irradiated fuel stringer 22 in a channel 21 is desired to be removed.

With the refuelling machine 2 in position, the seal plug 7b is connected by a coupling 83 to the plug part 22a of the irradiated fuel stringer 22 and the nose-piece 6 then moved down to connect with the upper end of the access tube 4. $CO_2$ gas is now fed into the space between the seal plug 7b and plug part 22a by double pressurisation to 285 p.s.i. (using the facility 100) alternating with evacuation (using the facility 101) and followed by pressurisation to 285 p.s.i.

With the pressures balanced across the seal plug 7b and plug part 2a, the hoist 44b is used to withdraw the irradiated fuel stringer 22 from the core 5 via the access tube 4 up into the magazine tube 43b, the nose-piece seal 77 being cooled by employing branch line 75 during this operation and the subsequent one of lowering the new fuel stringer 22 into the core 5. Next, the magazine 42 is rotated to bring the magazine tube 43a into line with the nose-piece 6 and the hoist 44a then used to lower the new fuel stringer 22 into the reactor core 5, to replace the irradiated fuel stringer 22.

Gas is now removed from the space between the seal plug 7a and the plug part 22a of the new fuel stringer by double alternate evacuation (using the facility 101) and pressurisation (using the facility 102) to 285 p.s.i., and then final evacuation to atmospheric pressure. The nose-piece 6 is then raised, the coupling 83 operated to break the connection, and the refuelling machine 2 moved away to connect with the member 8a, to commence another cycle of operation as has been described.

We claim:

1. A pressurising facility for employment in conjunction with a gas-cooled nuclear reactor refuelling machine which machine is movable across the reactor charge face and has a valved nose-piece for connection in a pressure-tight manner to any one of a plurality of core access tubes of the nuclear reactor which terminate at the reactor charge face, said pressurising facility comprising a fixed tubular member remote and separate from said core access tubes and disposed with one end at charge face level so as to be accessible to said refuelling machine nose-piece, means on said accessible end of said tubular member for engagement by said nose-piece in pressure-tight manner, a fixed source of pressurised gas of the same kind as the reactor coolant gas, means, unassociated with said nose-piece, for connecting said source with the interior of said tubular member, and means for controlling the pressure of gas within said tubular member.

2. A pressurising facility according to claim 1, wherein the tubular member is constituted by a portion of a transit tube extending from adjacent the reactor charge face to a fuel storage facility, a valve in the transit tube serving for isolating said portion from the remainder of the transit tube.

3. A pressurising facility according to claim 1, wherein said means connecting a source of pressurised gas with the interior of said tubular member includes a duct connecting the reactor coolant gas circuit with the interior of said tubular member, and a flow restrictor and control valve in said duct.

4. A pressurising facility according to claim 3, wherein said means for controlling the pressure of gas within said tubular member includes a second duct which by-passes that part of the first-mentioned duct which has the flow restrictor and control valve, said second duct including a compressor and a non-return valve preventing reactor coolant gas flowing in the second duct in a direction from the reactor coolant circuit to the tubular member only, and a second control valve and a pressure gauge disposed between said second (by-pass) duct and said tubular member.

5. A pressurising facility according to claim 4, wherein said tubular member also has, connected to its interior, means for selectively purging the interior of the tubular member with gas of the same kind as the reactor coolant gas and with air, said purging means including exhausting means.

References Cited by the Examiner
UNITED STATES PATENTS

| | | | |
|---|---|---|---|
| 2,981,422 | 4/1961 | Bellinger et al. | 176—30 |
| 3,158,544 | 11/1964 | Long et al. | 176—32 |

CARL D. QUARFORTH, *Primary Examiner.*
L. DEWAYNE RUTLEDGE, *Examiner.*